United States Patent
Versteyhe et al.

(10) Patent No.: US 10,174,797 B2
(45) Date of Patent: Jan. 8, 2019

(54) CLUTCH CONTROL WITH INTEGRATED DIAGNOSTICS/PROGNOSTICS AND TELEMATICS INTERFACE

(71) Applicant: DANA LIMITED, Maumee, OH (US)

(72) Inventors: Mark R. J. Versteyhe, Oostkamp (BE); Arnout R. L. De Mare, Anzegem (BE); Thomas J. Vyncke, Deinze (BE)

(73) Assignee: Dana Limited, Maumee, OH (US)

( * ) Notice: Subject to any disclaimer, the term of this patent is extended or adjusted under 35 U.S.C. 154(b) by 371 days.

(21) Appl. No.: 14/392,377

(22) PCT Filed: Sep. 9, 2014

(86) PCT No.: PCT/US2014/054688
§ 371 (c)(1),
(2) Date: Mar. 3, 2016

(87) PCT Pub. No.: WO2015/035355
PCT Pub. Date: Mar. 12, 2015

(65) Prior Publication Data
US 2016/0223034 A1    Aug. 4, 2016

Related U.S. Application Data

(60) Provisional application No. 61/875,181, filed on Sep. 9, 2013.

(51) Int. Cl.
*F16D 48/06*      (2006.01)

(52) U.S. Cl.
CPC .... *F16D 48/06* (2013.01); *F16D 2500/10412* (2013.01); *F16D 2500/3124* (2013.01);
(Continued)

(58) Field of Classification Search
None
See application file for complete search history.

(56) References Cited

U.S. PATENT DOCUMENTS 7,786,864 B1    8/2010    Shostak et al.
8,416,067 B2    4/2013    Davidson et al.
(Continued)

FOREIGN PATENT DOCUMENTS

WO    2010/030341 A1    3/2010

OTHER PUBLICATIONS

European Patent Office, International Search Report with Written Opinion of PCT/US2014/054688; dated Sep. 24, 2015; 8 pages; European Patent Office, Rijswijk, Netherlands.

*Primary Examiner* — Jacob S. Scott
(74) *Attorney, Agent, or Firm* — Marshall & Melhorn, LLC

(57) ABSTRACT

A controller for a vehicle system and a method for updating a plurality of control settings and system parameters for a controller for a vehicle system are provided. The controller comprises a control unit portion, a prognostic module, a diagnostic module, and a telematics interface. The control unit portion is in communication with the vehicle system to initiate a vehicle system procedure. The prognostic module is in two way communication with the control unit portion. The diagnostic module is in communication with the prognostic module and is in two way communication with the control unit portion. The telematics interface is in two way communication with the control unit portion. A plurality of control settings and system parameters are sent to one of the diagnostic module and the prognostic module to be compared with previously stored data stored in one of the diagnostic module and the prognostic module.

17 Claims, 1 Drawing Sheet

(52) U.S. Cl.
CPC .............. *F16D 2500/3128* (2013.01); *F16D 2500/5118* (2013.01); *F16D 2500/70673* (2013.01)

(56) References Cited

U.S. PATENT DOCUMENTS

| | | | |
|---|---|---|---|
| 8,442,702 B2 | 5/2013 | Geiter | |
| 8,896,430 B2 | 11/2014 | Davidson et al. | |
| 9,026,304 B2 | 5/2015 | Olsen, III et al. | |
| 2002/0049535 A1 | 4/2002 | Rigo et al. | |
| 2003/0009270 A1* | 1/2003 | Breed | B60C 11/24 701/32.4 |
| 2006/0180371 A1* | 8/2006 | Breed | G07C 5/008 180/197 |
| 2007/0005202 A1* | 1/2007 | Breed | B60W 50/0205 701/29.1 |
| 2007/0271014 A1* | 11/2007 | Breed | B60J 10/00 701/31.9 |
| 2008/0147271 A1* | 6/2008 | Breed | B60R 21/0132 701/36 |
| 2008/0284575 A1* | 11/2008 | Breed | B60C 23/0493 340/438 |
| 2009/0043441 A1* | 2/2009 | Breed | G06K 7/10178 701/31.9 |
| 2012/0089299 A1* | 4/2012 | Breed | B60C 11/24 701/36 |
| 2015/0046062 A1 | 2/2015 | Davidson et al. | |
| 2015/0170440 A1 | 6/2015 | Davidson et al. | |
| 2015/0179004 A1 | 6/2015 | Davidson et al. | |
| 2015/0199854 A1 | 7/2015 | Olsen, III et al. | |

\* cited by examiner

CLUTCH CONTROL WITH INTEGRATED DIAGNOSTICS/PROGNOSTICS AND TELEMATICS INTERFACE

RELATED APPLICATION

The present application claims the benefit of U.S. Provisional Application No. 61/875,181 filed on Sep. 9, 2013, which is incorporated herein in its entirety by reference.

FIELD OF THE INVENTION

The invention relates to control of vehicle systems and, more particularly, to a controller and method for updating a plurality of control settings and system parameters.

BACKGROUND OF THE INVENTION

A wet-clutch, stepped ratio transmission may incorporate the function of being able to learn control settings and system parameters during operation of a vehicle the wet-clutch, stepped ratio transmission is incorporated in. Monitoring the variation of the control settings and the system parameters over short and long term periods of time provides many benefits. Monitoring the variation allows a system to diagnose transmission problems, to predict a remaining useful life of the transmission or a transmission component, or predict a time of failure of the transmission or a transmission component. Furthermore, such information regarding remaining useful life, component wear, and component failure can be used to adapt how the transmission is controlled.

In most vehicle controllers, especially in the automotive sector, information gathered from a plurality of sensors (both from control systems and purpose-specific sensors) may be used in a diagnostics and prognostics system to detect component failure and to assist in a maintenance schedule of a vehicle including the diagnostics and prognostics system.

Typically, on-board diagnostic (OBD) systems used in vehicles use one-way communication, which is most commonly used for signaling problems to an operator of the vehicle. The on-board diagnostic system, in some cases, may be configured to communicate over a wireless connection to other devices.

Prognostics systems are used less often in vehicles, especially in off-highway applications, where maintenance is typically planned after a certain number of operating hours, other pre-determined intervals, or after a predetermined number of clutch engagements, for example.

Recently, wet clutch transmissions have been developed that include systems incorporating learning parameters. When performing a shift between two gears, for example, a pressure profile may be analyzed to determine if the shift is correctly performed. If one or more anomalies are detected, the parameters may be adapted using online algorithms. Non-limiting examples of parameters which may be adjusted using such algorithms are fill pressure, timing (a duration of a filling of the clutch), and kiss pressure.

Learned parameters might vary because of real working conditions being different from a set of initial operating conditions for which the transmission was designed. Non-limiting examples of such conditions are temperature fluctuation and lubricant variability. Such parameters will also vary over time because of a wearing of the clutches, an oxidation of the lubricant, or other effects. Such variations over time can be interpreted to help the diagnostic and prognostic system by providing the system with additional information.

It would be advantageous to develop a vehicle controller including a diagnostics and prognostics module used with a vehicle transmission that provides enhanced interaction within and to and from the controller.

SUMMARY OF THE INVENTION

Presently provided by the invention, a vehicle controller including a diagnostics and prognostics module used with a vehicle transmission that provides enhanced interaction within and to and from the controller, has surprisingly been discovered.

In one embodiment, the present invention is directed to a controller for a vehicle system. The controller comprises a control unit portion, a prognostic module, a diagnostic module, and a telematics interface. The control unit portion is in communication with the vehicle system to initiate a vehicle system procedure. The prognostic module is in two way communication with the control unit portion. The diagnostic module is in communication with the prognostic module and is in two way communication with the control unit portion. The telematics interface is in two way communication with the control unit portion. A plurality of control settings and system parameters are sent to one of the diagnostic module and the prognostic module to be compared with previously stored data stored in one of the diagnostic module and the prognostic module.

In another embodiment, the present invention is directed to a method for updating a plurality of control settings and system parameters for a controller for a vehicle system. The method comprising the steps of providing a control unit portion in communication with the vehicle system to initiate a vehicle system procedure, providing a prognostic module in two way communication with the control unit portion, providing a diagnostic module in communication with the prognostic module and in two way communication with the control unit portion, providing a telematics interface in two way communication with the control unit portion, sending a plurality of control settings and system parameters to one of the diagnostic module and the prognostic module, and comparing the plurality of control settings and system parameters sent to one of the diagnostic module and the prognostic module to previously stored data stored in one of the diagnostic module and the prognostic module.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
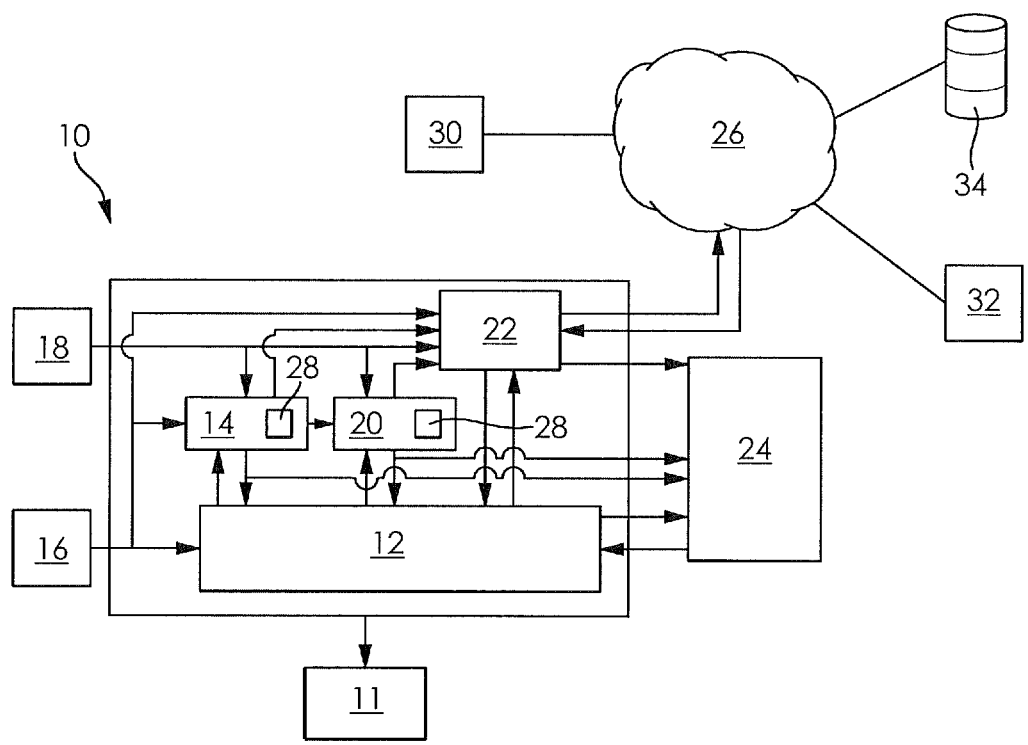
FIG. 1 is a schematic illustration of a controller for a vehicle system according to the present invention.

A vehicle controller 10 is shown in FIG. 1. The vehicle controller 10 is a controller for a transmission 1; however, it is understood that the vehicle controller 10 may form a portion of a controller used for controlling multiple vehicle systems. The vehicle controller 10 includes a control unit portion 12; a diagnostic module 14 in communication with a control sensor 16 and optionally with a diagnostic sensor 18; a prognostic module 20 in communication with the control sensor 16 and optionally with the diagnostic sensor 18; and a telematics interface 22. It is to be understood that in a preferred embodiment of the vehicle controller 10, the diagnostic sensor 18 is not needed; however, in some embodiments of the vehicle controller 10, the diagnostic sensor 18 may be included. The telematics interface 22 is in communication with a vehicle dashboard 24, the control unit portion 12, the diagnostic module 14, the prognostic module 20, and a computer network 26 (which may be commonly referred to as a cloud). The vehicle dashboard 24 provides information to an operator of a vehicle (not shown) that the vehicle controller 10 is incorporated into. Two way communication is provided between the control unit portion 12 and the diagnostic module 14, the control unit portion 2 and the prognostic module 20, and the control unit portion 12 and the telematics interface 22. The control unit portion 12 is used to initiate shifting procedures in the transmission 11 that the vehicle controller 10 is in communication with.

Figure 2:
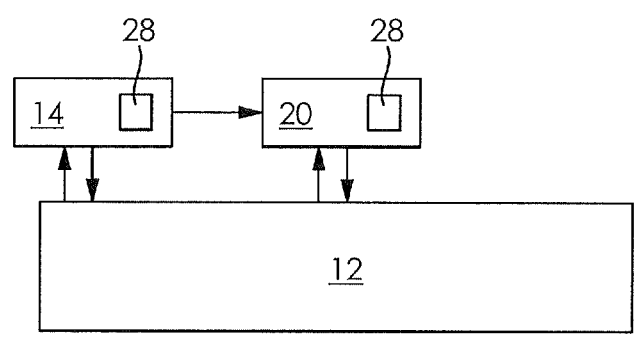
FIG. 2 is a schematic illustration of a portion of the controller for a vehicle system illustrated in FIG. 1.

The vehicle controller 10 provides enhanced interaction between the diagnostic module 14, the prognostic module 20 and the control unit portion 12. The enhanced interaction is schematically illustrated in FIG. 2. The enhanced interaction is performed in various ways, which are described hereinbelow.

A plurality of control settings and system parameters 28 learned by the vehicle controller 10 are sent to the diagnostic module 14 and the prognostic module 20. The control settings and system parameters 28 are compared to previously stored data (which has been supplemented with data obtained from the telematics interface 22 or statistical information obtained from testing of a system including the vehicle controller 10) to determine if a fault is present and what effects the control settings and system parameters 28 will have on the system including the vehicle controller 10.

An imminent failure of a component or a rapid wearing of a component of the system, including the vehicle controller 10, that is detected by one of the diagnostic module 14 and the prognostic module 20 is defined as a fault. If a fault is present, the vehicle controller 10 will attempt to keep the vehicle in an operational state as long as possible. Preferably, the vehicle controller 10 will attempt to keep the vehicle in an operational state until maintenance can be performed. The vehicle controller 10 may use utilize the information detected by one of the diagnostic module 14 and the prognostic module 20 to adjust shifting procedures in the transmission 11, such as through an adjustment made to a pressure profile of a clutch. Other non-limiting examples of how the vehicle controller 10 may use the information detected by one of the diagnostic module 14 and the prognostic module 20 are:

The vehicle controller 10 may avoid the use of one or more clutch or gear selection. It is understood that as a result, the vehicle controller 10 may perform double swap shifts. When a double swap shift is performed, two clutches are released and two different clutches are applied.

The vehicle controller 10 may perform upshifts or downshifts in a reduced amount of time to reduce an amount of time spent in a particular gear ratio.

Additionally, a long term evolution of the control settings and system parameters 28 may be provided to the diagnostic module 14 and the prognostics module 20 so that the diagnostic module 14 and the prognostic module 20 can predict a remaining life of components of the transmission 11 and of a lubricant used with the transmission 11. In performing this task, the prognostic module 20 might interact through the telematics interface 22 to schedule maintenance of the vehicle or to provide information to a central fleet management controller 30. The prognostic module 20 might also be used to determine if the long term evolution of the control settings and system parameters 28 are consistent with expectations and empirical and theoretical models of the control settings and system parameters 28.

Additionally, the telematics interface 22 may also be used to:

Signal a need for maintenance to the central fleet management controller 30,

Perform at least a portion of diagnostic and prognostic calculations offline (for example, calculations to be performed on a remote computing device 32), where performing such calculations on the remote computing device 32 results in increased precision of the diagnostic and prognostic calculations, Use information about an operating environment of the vehicle (for example, a conditions of the weather the vehicle is currently operating in, a gradient of a road the vehicle is traversing, and a roughness of a road the vehicle is traversing) in the diagnostic module 14 and the prognostic module 20, and Use information from other vehicles obtained through the central fleet management controller 30 and continuously adapt the interpretation of the signals from other vehicles by enriching a database 34 (accessed via the computer network 26) of the diagnostic and prognostics modules 14 and 20 of the vehicle with new and updated information (in certain cases, the new and updated information may come from other vehicles or may be updated during maintenance of the vehicle).

Telematics used in for the above described applications may include inputs from many interfaces such as a smartphone, a tablet style computer, a vehicle based computer, and a warehouse based computer, as non-limiting examples. Any of the aforementioned devices may be used to display information regarding any of the vehicles from a fleet of vehicles. Any of the aforementioned devices may also allow users of the devices to perform actions in response to the displayed information.

Compared to the state of the art, the vehicle controller 10 including the above described diagnostic and prognostics modules 14 and 20 provides many innovative benefits over conventional controllers used with vehicles. One benefit of the vehicle controller 10 is the integration between the control unit portion 12, the diagnostic module 14, and the prognostic module 20. The above described integration provides an increased reliability of the prognostic module 20 and the diagnostic module 14 based on an evolution of the control parameters.

Another benefit of the vehicle controller 10 is to leverage the prognostic module 20 and the diagnostic module 14 using feedback to the control unit portion 12, not just to the operator (such as through, but not limited to, the vehicle dashboard 24 or the telematics interface 22) and/or the central fleet management controller 30. As a non-limiting example, information collected by the prognostic module 20 and the diagnostic module 14 may be used to adjust a shifting strategy or control parameters depending on determinations made by the prognostic module 20 and the diagnostic module 14. Additionally, all of the information generated using the above described processes may be stored in the computer network 26 and may be shared with other vehicles in the fleet, with at least one infrastructure component (not shown), and with at least one maintenance component, for example, through the assistance of the telematics interface 22.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A controller for a vehicle transmission, the controller comprising:
    a control unit portion in communication with the transmission to initiate a vehicle system procedure;
    a prognostic module in two way communication with the control unit portion;
    a diagnostic module in communication with the prognostic module and in two way communication with the control unit portion;
    a telematics interface in two way communication with the control unit portion, wherein a plurality of control settings and system parameters of a vehicle are sent to one of the diagnostic module and the prognostic module to be compared with previously stored data stored in one of the diagnostic module and the prognostic module; and
    wherein in response to the plurality of control settings and system parameters the controller adjusts the shifting procedures of the transmission in order to keep the vehicle in an operational state until maintenance can be performed by adjusting a pressure profile of a clutch, by avoiding the use of one or more clutches, by avoiding the use of one or more gear selections, by performing double swap shifts or by performing upshifts or downshifts more quickly thereby reducing an amount of time that the transmission operates in a particular gear ratio.

2. The controller according to claim 1, further comprising a vehicle dashboard in communication with the telematics interface, the control unit portion, the prognostic module, and the diagnostic module.

3. The controller according to claim 1, further comprising a control sensor, the diagnostic module and the prognostic module in communication with the control sensor.

4. The controller according to claim 1, further comprising a diagnostic sensor, the diagnostic module and the prognostic module in communication with the diagnostic sensor.

5. The controller according to claim 1, wherein the telematics interface is in two way communication with a computer network.

6. The controller according to claim 1, wherein the plurality of control settings and system parameters are supplemented with data obtained from the telematics interface.

7. The controller according to claim 1, wherein the plurality of control settings and system parameters are supplemented with statistical information obtained from testing of the transmission.

8. The controller according to claim 7, wherein the diagnostic module and the prognostic module are used to predict a condition of the transmission based on an evolution of the control settings and system parameters.

9. The controller according to claim 8, wherein the prognostic module interacts with the telematics interface to schedule vehicle maintenance or to provide information to a central fleet management controller.

10. The controller according to claim 8, wherein the prognostic module is used to determine if the evolution of the control settings and system parameters are consistent with empirical and theoretical models of the control settings and system parameter.

11. The controller according to claim 1, wherein the telematics interface performs at least a portion of diagnostic and prognostic calculations in an offline manner to increase a precision of the diagnostic and prognostic calculations.

12. The controller according to claim 5, wherein the telematics interface uses information about an operating environment of the vehicle in the diagnostic module and the prognostic module.

13. The controller according to claim 5, wherein the telematics interface uses information from other vehicles obtained through a computer network.

14. The controller according to claim 13, wherein the telematics interface adapts the interpretation of the signals from other vehicles through a central fleet management controller in order to continuously adapt the interpretation of the signals received from the other vehicles by enriching a database.

15. A method for updating a plurality of control settings and system parameters for a controller for a vehicle transmission, the method comprising the steps of:
    providing a control unit portion in communication with the transmission to initiate a vehicle system procedure;
    providing a prognostic module in two way communication with the control unit portion;
    providing a diagnostic module in communication with the prognostic module and in two way communication with the control unit portion;
    providing a telematics interface in two way communication with the control unit portion;
    sending a plurality of control settings and system parameters to one of the diagnostic module and the prognostic module;
    comparing the plurality of control settings and system parameters sent to one of the diagnostic module and the prognostic module to previously stored data stored in one of the diagnostic module and the prognostic module; and
    maintaining the transmission in an operational condition, wherein in response to the plurality of control settings and system parameters the controller adjusts the shifting procedures of the transmission in order to keep the vehicle in an operational state until maintenance can be performed by adjusting a pressure profile of a clutch, by avoiding the use of one or more clutches, by avoiding the use of one or more gear selections, by performing double swap shifts or by performing upshifts or downshifts more quickly thereby reducing an amount of time that the transmission operates in a particular gear ratio.

16. The method according to claim 15, further comprising providing a vehicle dashboard in communication with the telematics interface, the control unit portion, the prognostic module, and the diagnostic module.

17. The method according to claim 15, further comprising providing a control sensor and at least one diagnostic sensor, wherein the diagnostic module and the prognostic module are in communication with the control sensor and the at least one diagnostic sensor.

* * * * *